United States Patent [19]
Faulstich

[11] 3,750,845

[45] Aug. 7, 1973

[54] SUPPORT MOUNTING ASSEMBLY

[76] Inventor: Eugene W. Faulstich, 209 S. Main St., Algona, Iowa 50501

[22] Filed: July 1, 1971

[21] Appl. No.: 158,878

[52] U.S. Cl. .......................... 182/127, 248/226 D
[51] Int. Cl. ............................................ E06c 5/34
[58] Field of Search ................ 248/201, 226 E, 43; 224/42.1 E, 42.1 F, 42.1 G; 214/450; 182/127

[56] References Cited
UNITED STATES PATENTS

| | | | |
|---|---|---|---|
| 3,203,728 | 8/1965 | Wood | 248/43 X |
| 1,194,746 | 8/1916 | Keeler | 248/43 X |
| 3,381,866 | 5/1968 | Wickett | 224/42.1 E |
| 3,191,898 | 6/1965 | McCullough | 248/43 |
| 3,512,082 | 5/1970 | Joos | 224/42.1 E |
| 3,493,203 | 2/1970 | Gualano | 224/42.1 G X |
| 3,363,788 | 1/1968 | Grosclaude et al. | 214/150 |

Primary Examiner—William H. Schultz
Attorney—Zarley, McKee & Thomte

[57] ABSTRACT

A support mounting assembly for a truck to support an aerial tower, the support including a combination of two brackets one of which has an L-shaped portion and a threaded sleeve element integrally connected to one leg for receiving a threaded pipe or the threaded end of the leg of the other bracket which is L-shaped and includes a sleeve as the other leg of the L. Oppositely disposed L-shaped brackets may receive horizontally arranged conventonal pipe to provide a support structure. Reinforcement members may be connected to the vertical leg of the L-shaped bracket as a pair of threaded bosses are provided. Conventonal extension pipe may be inserted between the vertical leg of the L-shaped bracket and the threaded sleeve of the first bracket to give the desired height to the support structure. The L-shaped portion of the first bracket is adapted to be connected to any surface including the rain gutter around the top of a vehicle or the corners of the cabinets on a utility-type truck or the flat bed of a truck.

4 Claims, 8 Drawing Figures

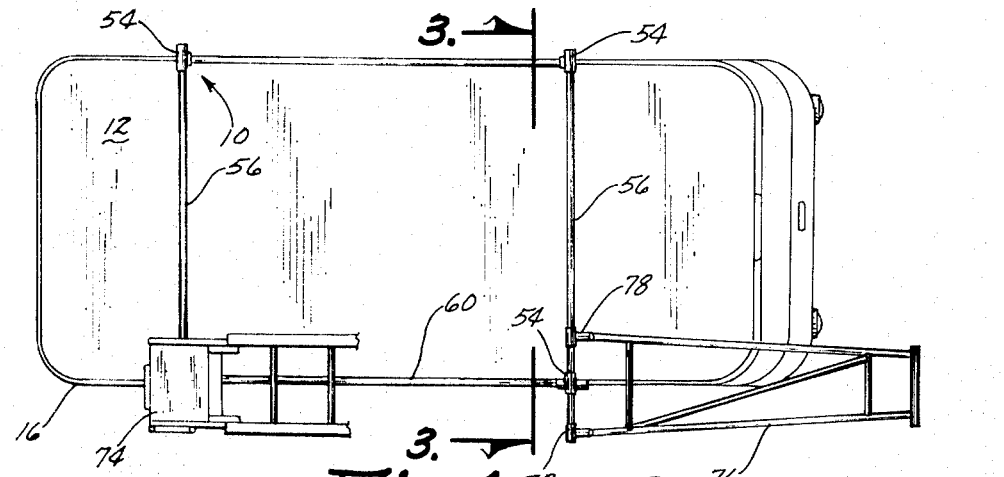

SUPPORT MOUNTING ASSEMBLY

An aerial boom or ladder may be mounted on different types of vehicles including van trucks, utility trucks and pickup trucks. The mounting structure heretofore had to be specifically designed for each type of vehicle. Very few of the mounting components were universally applicable to the different types of vehicles.

The support mounting assembly of this invention includes a pair of basic bracket components which can be utilized not only in mounting the tower to various vehicles but in constructing the assembly and thus it has universal application. The first mounting bracket includes an L-shaped portion and a threaded sleeve portion integrally connected intermediate the ends of one of the legs of the L-shaped portion. The threaded end of the one leg of the L-shaped bracket is received in the threaded sleeve of the first bracket thus horizontally positioning the sleeve of the L-shaped bracket such that four of these combination brackets arranged at the corners of a vehicle provide the necessary support structure for horizontally disposed transverse members being positioned in the sleeves of the oppositely disposed L-shaped brackets. This conventional pipe may be locally obtained and be cut to the desired length. If it is desired to raise the support structure then conventional pipe may be inserted between the vertical leg of the L-shaped bracket and the sleeve of the first base bracket. Longitudinally extending reinforcing members may be constructed including conventional pipe received in the sleeve portions of the first bracket with the L-shaped portions being bolted to the vertical legs of the L-shaped brackets utilizing threaded bosses on the vertical leg portions. Thus with the two special brackets of this invention any desired ladder support structure may be constructed to fit any type of vehicle flat bed pickup truck, utility truck, or van-type truck.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a fragmentary top plan view of a van-type truck utilizing the support mounting assembly of this invention to provide a platform for an aerial ladder;

FIG. 2 is a fragmentary side view thereof;

FIG. 3 is a cross sectional view taken along line 3 — 3 in FIG. 1;

FIG. 4 is a perspective view of one of the universal mounting brackets;

FIG. 5 is an enlarged fragmentary view of the support structure utilizing in combination the two universal mounting brackets;

FIG. 6 is a cross sectional view taken along line 6 — 6 in FIG. 5;

FIG. 7 is a fragmentary elevational view of an alternative mounting arrangement wherein the support structure is mounted on the side cabinets of a utility-type truck; and FIG. 8 is a perspective view of the two universal brackets in combination.

The support mounting assembly of this invention is referred to in FIG. 1 generally by the reference numeral 10 and is mounted on the top 12 of a van-type truck 14. A channel-shaped rain gutter 16 extends around the periphery of the roof 12.

At four corners of the van 14 one of the universal mounting brackets of this invention 20 is connected to the rain gutter 16. The bracket 20 includes an L-shaped portion 22 having a downwardly extending leg 24 received in the upwardly facing rain gutter 16 and outwardy extending leg 26 has an internally threaded sleeve 28 integrally secured to its upper face and receives the threaded end of a post or leg 29 on the other universal bracket 30 which is L-shaped. The horizontally disposed leg 26 includes outer longitudinal edges 31 which taper in opposite directions from the sleeve 28 towards the downwardly extending leg 24. The width of the horizontally disposed leg 26 is substantially equal to the outer diameter of the threaded sleeve 28.

An L-shaped plate 34 includes an upstanding leg 36 parallel to the leg 24 of the bracket 20 and the other leg 38 of the plate 34 extends under and perpendicular to the leg 24 of the bracket 20. It is seen in FIG. 3 that the channel 16 including the base 40 and the outer upstanding leg 42, are sandwiched inbetween the leg 24 of the bracket 20 and the legs 36 and 38 of the L-shaped clamping plate 34. A bolt 44 having a spacer 46 thereon between legs 24 and 36 secure the clamping plate 34 in place. The inner leg 50 of the channel 16 merges into the curved roof structure 12 of the panel truck 14.

As seen in FIG. 5, a pair of the clamping plates 34 are utilized for the mounting bracket 20 and each plate 34 is held in place by a pair of bolts 44.

The upstanding leg 29 of the other bracket 30 in the sleeve 28, as seen in FIGS. 5, 6 and 8, terminates in a transversely extending sleeve portion 54 which receives a transversely extending conventional pipe 56 interconnecting oppositely disposed sleeves 54 on brackets 30 on opposite sides of the van 14.

As seen in FIG. 5, longitudinally extending pipe members 60 include brackets 20A at their opposite ends which engage the upstanding leg 29 by the L-shaped portions being bolted to the legs 29 by bolts 62 being received in bosses 63. The outer end of the sleeve 54 may be closed by a cap element 64. The pipe pieces 56 received in the sleeve portions 54 may be locked in place by setscrews 65.

Thus in operation it is seen, for example, that the four combination brackets 20 and 30 connected to the rain gutter 16 at the four corners of the roof 12 provide upstanding supports for the rectangular support structure comprising the cross pipe members 56 and the longitudinally extending members 60. The longitudinal pipe members 60 and the front and rear upstanding legs 29 are interconnected by the mounting brackets 20A by the L-shaped portions being bolted thereon. the longitudinal and transverse members 56 and 60 are all made from conventional pipe readily available to owners of all types of trucks subsequently acquiring an aerial tower or ladder 70, as illustrated in FIGS. 1 and 2. The extendable ladder 70 includes a vertically disposed ladder 72 positioned on the side of the van 14 and leads to a platform 74 at the top of the van for departure onto the ladder 70. The details of the extendable boom 70 comprising ladder sections are set forth in my U.S. Pat. No. 3,425,508, Feb. 4, 1969. A forward ladder support 76 is secured to the transverse pipe member 56 by T-sleeve members 78 whereby the support member 76 may pivot between raised and lowered positions.

An alternate mounting arrangement for the aerial boom support frame is illustrated in FIG. 7 wherein the upstanding legs 29 of brackets 30 are connected to the universal mounting brackets 20 and the legs 24 and 26 of the L-shaped portion matingly engage the square cabinet corner 80 on a pickup type truck wherein the pickup bed is exposed at 82 therebetween. Bolt fasteners 84 extend through the downwardly extending leg 24 to secure the bracket 20 to the cabinets 80.

The support brackets 20 at the front of the vehicle as seen in FIG. 2, carry greater weight than the rear support brackets and thus the rear support brackets 20A have been shortened in their length and require only one clamping plate 34. The bracket 20A at the rear is similar in shape to the bracket 20A engaging the upstanding leg 29 as seen in FIG. 6.

I claim:

1. In combination, a vehicle having an upwardly facing U-shaped rain gutter on opposite sides thereof adjacent the roof of the vehicle, a mounting bracket assembly at each end and on each side of said vehicle, each assembly including a one piece member having a L-shaped bracket with flat plate legs substantially equal in length and width, and interconnected only along one pair of adjacent edges an upstanding threaded cylindrical portion open at its outer end on the outer face of one of said legs of said L-shaped bracket and extending perpendicular to said outer face, said cylindrical portion having a length substantially equal to the width of said L-shaped leg portions, a second L-shaped bracket having unequal width legs positioned in nesting relationship with said first L-shaped bracket with said U-shaped rain gutter therebetween, said shorter leg being in mating engagement with the bottom face of the base wall of said channel and the longer leg extending parallel to said other leg of said first L-shaped bracket and matingly engaging the outer face of the outer leg of said U-shaped rain gutter, bolt means locking the other leg of said first L-shaped bracket to the larger leg of said second L-shaped bracket and extending over the outer leg of said U-shaped rain gutter; a post having a threaded lower end engaging the threaded open end of said cylindrical portion, a horizontally disposed sleeve on the upper end of said post and a pipe extending transversely across each end of said vehicle over said roof with its ends telescopically engaging said sleeves on opposite sides of said vehicle and thereby providing a support for a platform over the roof of said vehicle.

2. The structure of claim 1 wherein said post and said sleeve on the upper end thereof are further defined as being a one piece unitary construction.

3. The structure of claim 1 wherein a horizontally disposed one piece L-shaped bracket is provided on each post, said bracket includes flat plate legs with a cylindrical portion open at its outer end on the outer face of one of said legs, bolt means extending through said leg and being received in boss means on said pipe for securing said bracket to said pipe, a brace includes a threaded end telescopically engaging said cylindrical portion with its other end operatively anchored to said vehicle.

4. The structure of claim 1 wherein said cylindrical portion is positioned intermediate the ends of said one leg and the maximum width of said one leg is substantially equal to the outer diameter of said cylindrical portion, and the exposed longitudinal edge of said one leg tapers towards said other leg in opposite directions away from said cylindrical portion.

* * * * *